United States Patent
Doering et al.

(10) Patent No.: US 9,145,969 B2
(45) Date of Patent: Sep. 29, 2015

(54) DECELERATION FUEL SHUT OFF SCHEDULING BASED ON VEHICLE PARAMETERS

(71) Applicants: Jeffrey Allen Doering, Canton, MI (US); Bradley Dean Riedle, Northville, MI (US); Diana Yanakiev, Birmingham, MI (US); Gregory Michael Pietron, Canton, MI (US); Hong Jiang, Birmingham, MI (US); Joseph F. Kucharski, Livonia, MI (US)

(72) Inventors: Jeffrey Allen Doering, Canton, MI (US); Bradley Dean Riedle, Northville, MI (US); Diana Yanakiev, Birmingham, MI (US); Gregory Michael Pietron, Canton, MI (US); Hong Jiang, Birmingham, MI (US); Joseph F. Kucharski, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 498 days.

(21) Appl. No.: 13/621,667

(22) Filed: Sep. 17, 2012

(65) Prior Publication Data

US 2014/0080668 A1 Mar. 20, 2014

(51) Int. Cl.
| | |
|---|---|
| *B60W 10/10* | (2012.01) |
| *F16H 61/02* | (2006.01) |
| *B60W 10/06* | (2006.01) |
| *B60W 30/18* | (2012.01) |
| *F16H 61/21* | (2006.01) |
| *F16H 61/14* | (2006.01) |

(52) U.S. Cl.
CPC .......... *F16H 61/0213* (2013.01); *B60W 10/06* (2013.01); *B60W 30/18072* (2013.01); *F16H 61/21* (2013.01); *B60W 2510/1005* (2013.01); *B60W 2530/10* (2013.01); *B60W 2710/0627* (2013.01); *B60Y 2300/46* (2013.01); *F16H 2061/0237* (2013.01); *F16H 2061/147* (2013.01); *Y10T 477/65* (2015.01); *Y10T 477/69* (2015.01)

(58) Field of Classification Search
CPC .......... B60W 30/18136; B60W 40/13; B60W 2710/0627; B60W 2530/10; B60W 10/10; Y10T 477/693; Y10T 477/873; Y10T 477/69
See application file for complete search history.

(56) References Cited

U.S. PATENT DOCUMENTS

| | | | |
|---|---|---|---|
| 8,050,856 | B2 | 11/2011 | Duty et al. |
| 2004/0014565 | A1 * | 1/2004 | Oshima et al. ................. 477/182 |
| 2004/0106497 | A1 * | 6/2004 | Ayabe et al. ................... 477/107 |
| 2007/0105689 | A1 * | 5/2007 | Arai .............................. 477/111 |
| 2007/0149357 | A1 | 6/2007 | Seaman et al. |
| 2008/0168964 | A1 * | 7/2008 | Kimura et al. ................. 123/325 |
| 2011/0054765 | A1 | 3/2011 | Lewis et al. |

* cited by examiner

*Primary Examiner* — Huan Le
(74) *Attorney, Agent, or Firm* — Julia Voutyras; Alleman Hall McCoy Russell & Tuttle LLP

(57) ABSTRACT

A method for enacting DFSO in a motor vehicle having an engine and a transmission. The method includes, during a condition of normal engine-braking efficiency, disabling the DFSO below a higher gear of the transmission. During a condition of reduced engine-braking efficiency, by contrast, the DFSO is disabled below a lower gear of the transmission.

20 Claims, 3 Drawing Sheets

DECELERATION FUEL SHUT OFF SCHEDULING BASED ON VEHICLE PARAMETERS

TECHNICAL FIELD

This application relates to the field of motor-vehicle engineering, and more particularly, to deceleration fuel shut off (DFSO) scheduling.

BACKGROUND AND SUMMARY

DFSO is a mode to improve fuel economy and reduce brake wear in a motor vehicles. In this approach, fuel injection to one or more cylinders is shut off during selected operating conditions. Such conditions include a state in which the driver's intention to decelerate is detected. Besides intention to decelerate, other factors may determine whether or not DFSO is enabled. In some motor-vehicle configurations, DFSO is enabled only at the highest gears of the transmission—e.g., fifth and sixth gear of a six-speed transmission. DFSO may be disabled at lower gears and lower vehicle speeds to avoid excessive deceleration due to increased driveline torque in the lower gears. In some cases, DFSO initiated in a lower gear or persisting across a coasting downshift may cause non-intuitive deceleration relative to vehicle speed or an excessive increase in the deceleration rate across a downshift, which is undesirable during most driving conditions.

The inventors herein have observed, however, that appropriate conditions for DFSO depend on other motor-vehicle parameters besides driver intention, vehicle speed and transmission gear. Such parameters include driven mass, driven wheel size, and road load, as examples. Because the driver interacts with the vehicle vis-à-vis the deceleration rate when coasting or braking, the impact of DFSO on vehicle deceleration will be affected by these other parameters. Depending on the values of the parameters, it may be desirable to enable DFSO at lower gears and through additional coasting downshifts, to extend the fuel-economy and brake-wear benefits of DFSO to a wider range of operating conditions, while providing desirable vehicle deceleration for the driver. Moreover, as driven mass, wheel diameter, and road load may vary for the same motor vehicle in different usage scenarios—e.g., towing/not towing, large payload and passenger load or unloaded, on- and off-roading—it may be desirable to provide automatic adjustment of DFSO as operating conditions change.

Accordingly, one embodiment of this disclosure provides a method for enacting DFSO in a motor vehicle having an engine and a transmission. The method includes, during a condition of normal engine-braking efficiency, disabling the DFSO below a higher gear of the transmission. During a condition of reduced engine-braking efficiency the DFSO is disabled below a lower gear of the transmission. In this manner, the fuel-economy and brake-wear benefits of DFSO are extended to a wider range of operating conditions.

The summary above is provided to introduce a selected part of this disclosure in simplified form, not to identify key or essential features. The claimed subject matter, defined by the claims, is limited neither to the content of this summary nor to implementations that address the problems or disadvantages noted herein.

DETAILED DESCRIPTION

Figure 1:
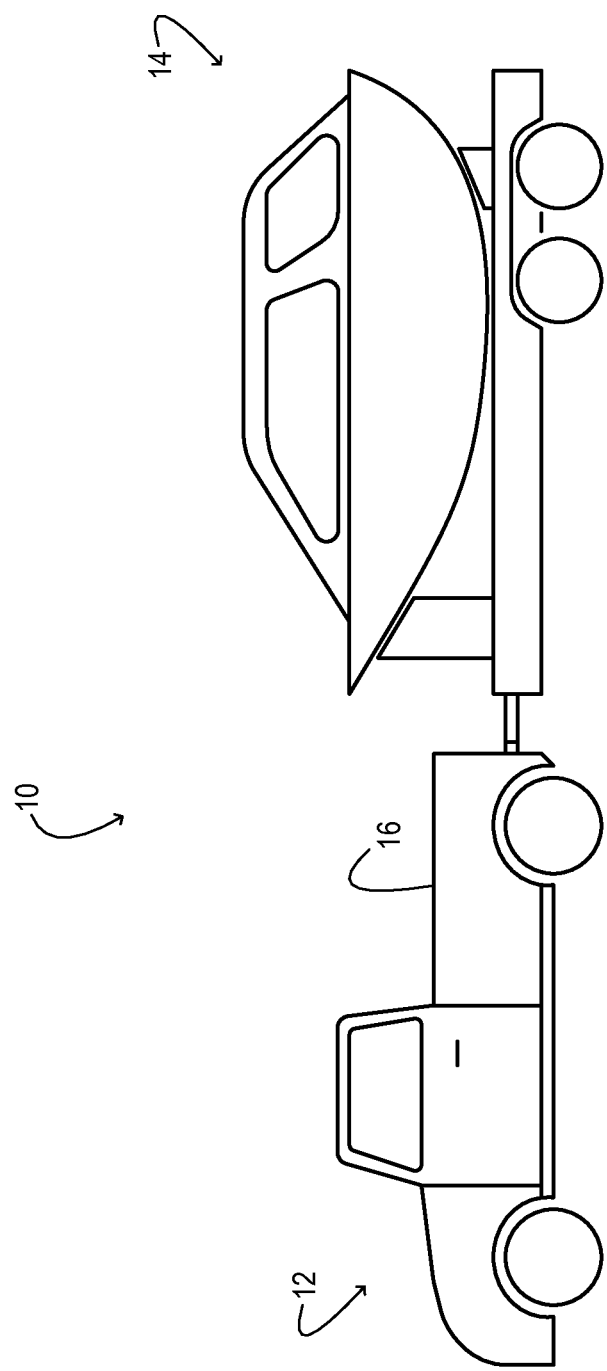
FIG. 1 schematically shows aspects of an example motor-vehicle system in accordance with an embodiment of this disclosure.

FIG. 1 schematically shows aspects of an example motor-vehicle system 10 in one embodiment. The system includes a driving portion in the form of motor vehicle 12 and a towed portion in the form of trailer 14. The motor vehicle includes a payload area 16. In some configurations, the content of the payload area and/or the trailer may contribute significantly to the overall mass of the motor-vehicle system. A loaded trailer itself may be three times the mass of the motor vehicle, in some scenarios. Although FIG. 1 specifically shows a truck with a trailer in tow, no aspect of the drawing should be interpreted in a limiting sense, for other embodiments are contemplated as well. In some systems, the trailer may be omitted. In these and other systems, the motor vehicle may be an automobile, minivan, or sport-utility vehicle with no payload area per se.

Figure 2:
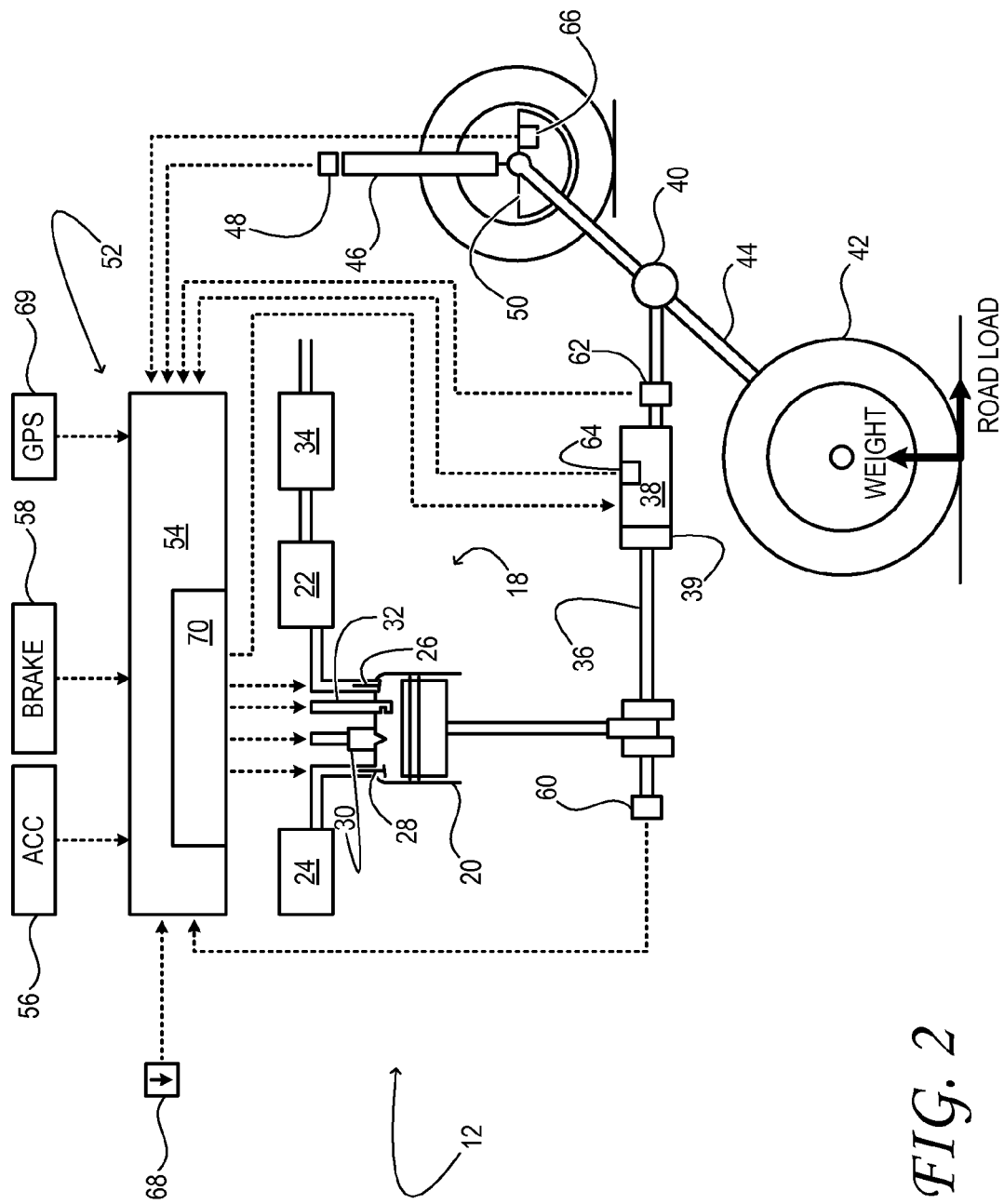
FIG. 2 schematically shows aspects of an example motor vehicle in accordance with an embodiment of this disclosure.

FIG. 2 schematically shows aspects of an example motor vehicle 12 in one embodiment. The motor vehicle includes engine 18, with a plurality of cylinders 20. Exhaust manifold 22 and intake manifold 24 are coupled to each of the cylinders through a series of exhaust valves 26 and intake valves 28, respectively. In one embodiment, the exhaust and/or intake valves may be electronically actuated. In another embodiment, the exhaust and/or intake valves may be cam actuated. Whether electronically actuated or cam actuated, the timing of exhaust and intake valve opening and closure may be adjusted as needed for desired combustion, fuel-economy, and emissions-control performance.

Cylinders 20 may be supplied any of a variety of fuels, depending on the embodiment: diesel, biodiesel, compressed natural gas, gasoline, alcohols, or mixtures thereof. In the illustrated embodiment, fuel is supplied to the cylinders via direct injection through fuel injectors 30. In the various embodiments considered herein, the fuel may be supplied via direct injection, port injection, throttle-body injection, or any combination thereof. In engine 18, combustion is initiated via spark ignition at spark plugs 32. The spark plugs are driven by timed, high-voltage pulses from an electronic ignition unit (not shown in the drawings). In other embodiments, combustion may be initiated via compression ignition in any variant. In engine 18, exhaust-aftertreatment stage 34 is coupled downstream of exhaust manifold 22, to suppress emissions. The nature, number, and arrangement of exhaust-aftertreatment stages in the engine may differ in the different embodiments of this disclosure.

In engine 18, mechanical energy from expanding combustion gas in cylinders 20 is transmitted to crankshaft 36. The rotation of the crankshaft is received in transmission 38. In one embodiment, the transmission may be an automatic transmission that provides a plurality of stepped, speed-reduction gear ratios. The gear ratio in use at any given time may depend on vehicle speed, engine speed, and other factors. In other embodiments, the transmission may be a manual transmission in which one of a plurality of stepped gear ratios is selected, as desired, by the driver. As used herein, a 'higher gear' of the transmission is setting that provides a numerically lower gear ratio; a 'lower gear' of the transmission is a setting that provides a numerically higher gear ratio. For example, sixth gear of a six-speed transmission may provide a gear ratio of 0.69 to 1, while fifth gear may provide a gear ratio of 0.89 to 1. Naturally, the numerical values and ranges disclosed herein are provided only by way of example; other values and ranges are contemplated as well.

In the embodiment of FIG. 2, motive force from the crankshaft is applied to transmission 38 through torque converter 39. The torque converter includes a fluid coupling that drives the transmission at reduced speed and increased torque under high-slip conditions. The torque convertor also includes a bypass clutch that mechanically couples the crankshaft to the transmission under low-slip conditions, for reduced power loss and other benefits.

In the embodiment of FIG. 2, motive force from transmission 38 is applied to differential 40, which drives the driven wheels 42 through drive axle 44. The drive axle is resiliently coupled to the chassis of the motor vehicle through a plurality of struts 46. One or more of the struts may include a weight sensor 48, which reports the downward force on the strut. One or more of the driven wheels of motor vehicle 12 may include a mechanical brake 50. In one embodiment, the mechanical brake may have an anti-lock feature that automatically reduces braking force in a periodic manner in response to diminished road load.

Continuing in FIG. 2, motor vehicle 12 includes electronic control system (ECS) 52 configured to control various motor-vehicle functions. The ECS includes memory and one or more processors configured for appropriate decision making in response to sensor input. Such decision-making may be enacted according to various strategies such as event-driven, interrupt-driven, multi-tasking, multi-threading, and the like. In this manner, the ECS may be configured to enact any or all aspects of the methods disclosed herein, wherein the various method steps—e.g., operations, functions, and acts—may be embodied as code programmed into machine-readable storage media in the ECS.

ECS 52 includes a sensor interface 54 to assess operating conditions of motor vehicle 12. To this end, the sensor interface receives input from various sensors arranged in the vehicle—flow sensors, temperature sensors, pedal-position sensors, pressure sensors, etc. Some example sensors are shown in FIG. 1—accelerator-pedal sensor 56, brake-pedal sensor 58, engine-speed sensor 60, wheel-rotation speed sensor 62, transmission temperature sensor 64, anti-lock brake sensor 66, weight sensor 48, inclinometer 68, and global-positioning system (GPS) receiver 69. Various other sensors may be included as well.

ECS 52 also includes control interface 70. The control interface is configured to actuate electronically controllable valves, actuators, and other componentry of the motor vehicle. The control interface is operatively coupled to each electronically controlled valve and actuator and is configured to command its opening, closure, and/or adjustment as needed to enact the control functions described herein.

In the approaches disclosed herein, DFSO is enabled during some operating conditions and disabled during others. More particularly, DFSO is applied more aggressively during a condition of reduced engine-braking efficiency relative to a condition of normal engine-braking efficiency. In one, non-limiting embodiment, the engine-braking efficiency E may be defined as the ratio $T_1/T_2$, where $T_1$ is the drive-line torque required to effect a predetermined amount of deceleration in the vehicle system under a standard set of conditions—e.g., 1 mile per hour (mph) per second at 70 mph on smooth, level grade with no brake applied—and $T_2$ is the resulting drive-line torque in DFSO in the highest transmission gear. Accordingly, an estimate of the engine-braking efficiency may be computed as a function of various parameters, as described below. In one embodiment, engine-braking efficiency above a predetermined numerical threshold may be considered 'normal' for the purposes set forth herein. Engine-braking efficiency below the predetermined numerical threshold may be considered 'reduced'. In another embodiment, normal and reduced engine-braking efficiencies may be output states of a fuzzy-logic approach using one or more of the parameters below as input. In still other embodiments, a multivariate look-up table may be used to distinguish between normal and reduced engine-braking efficiencies, based on operating parameters such as those identified herein.

Engine-braking efficiency is a function of the overall mass of a vehicle system—i.e., the driven mass of the motor vehicle. For instance, increased mass in a payload area or in a trailer towed by the motor vehicle will give the vehicle system more inertia, such that a given amount of drive-line torque will effect less deceleration than without the increased mass. Engine-braking efficiency is also a function of road load. In this discussion, road load is defined as the net vehicle tractive effort resulting from all factors other than the drive-line torque: the effect of gravity due to road grade, aerodynamic forces, and the rolling resistance of the wheels on the road. These factors, in turn, are affected by road conditions, vehicle and trailer aerodynamics and the geometric distribution of the vehicle mass. As an example, a vehicle pulling a large, empty trailer may decelerate relatively quickly at higher vehicle speeds due to increased aerodynamic drag, with little increase in driven mass.

Engine-braking efficiency is also a function of the particular variant of DFSO in use in the motor vehicle. Engine-braking efficiency is greater when the intake and exhaust valves of the engine continue to open and close with each cycle of the unfueled cylinder, effectively pumping air through the cylinder. In contrast, some DFSO strategies keep both valves of the unfueled cylinders closed, such that the air trapped in the cylinders undergoes repeated expansion and contraction at near-adiabatic conditions. This results in no pumping work being done by the unfueled cylinders, and consequently, less engine braking.

Engine-braking efficiency is also a function of the outside diameter of the driven wheels of the motor vehicle (i.e., the tire diameter). Other conditions being equal, larger wheels will drive the engine to a lower RPM for a given speed than smaller wheels will. The lower RPM provides reduced drive-line torque, and reduced engine-braking efficiency. Naturally, the engine-braking efficiency is also a function of the transmission gear ratio and the vehicle speed. Engine-braking efficiency decreases with increasing transmission gear and, in any given gear, increases with increasing vehicle speed.

Without intending to be limited by any particular theory, it will be noted that in one model, vehicle acceleration a is given by $$a = (F_T - F_{RL})/m$$

where $F_T$ is the tractive effort, $F_{RL}$ is the road load, and m is the driven mass. Furthermore, $$F_T = (T_e \times R_{gear} \times R_{FDR} - T_{spin})/r_{wheel}, \text{ and}$$

$$F_{RL} = F_{aero} F_{rolling} + mg \sin \alpha,$$

where $\alpha$ is the road grade (positive for uphill grades), $T_e$ is the engine torque, $R_{gear}$ is the gear ratio, $R_{FDR}$ is the final drive ratio, $T_{spin}$ is the torque loss in the drive train, and $r_{wheel}$ is the wheel radius.

The configurations and analysis above enable various methods for enacting DFSO in a motor vehicle. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke a complex decision-making logic. Such logic is fully contemplated in this disclosure.

Figure 3:
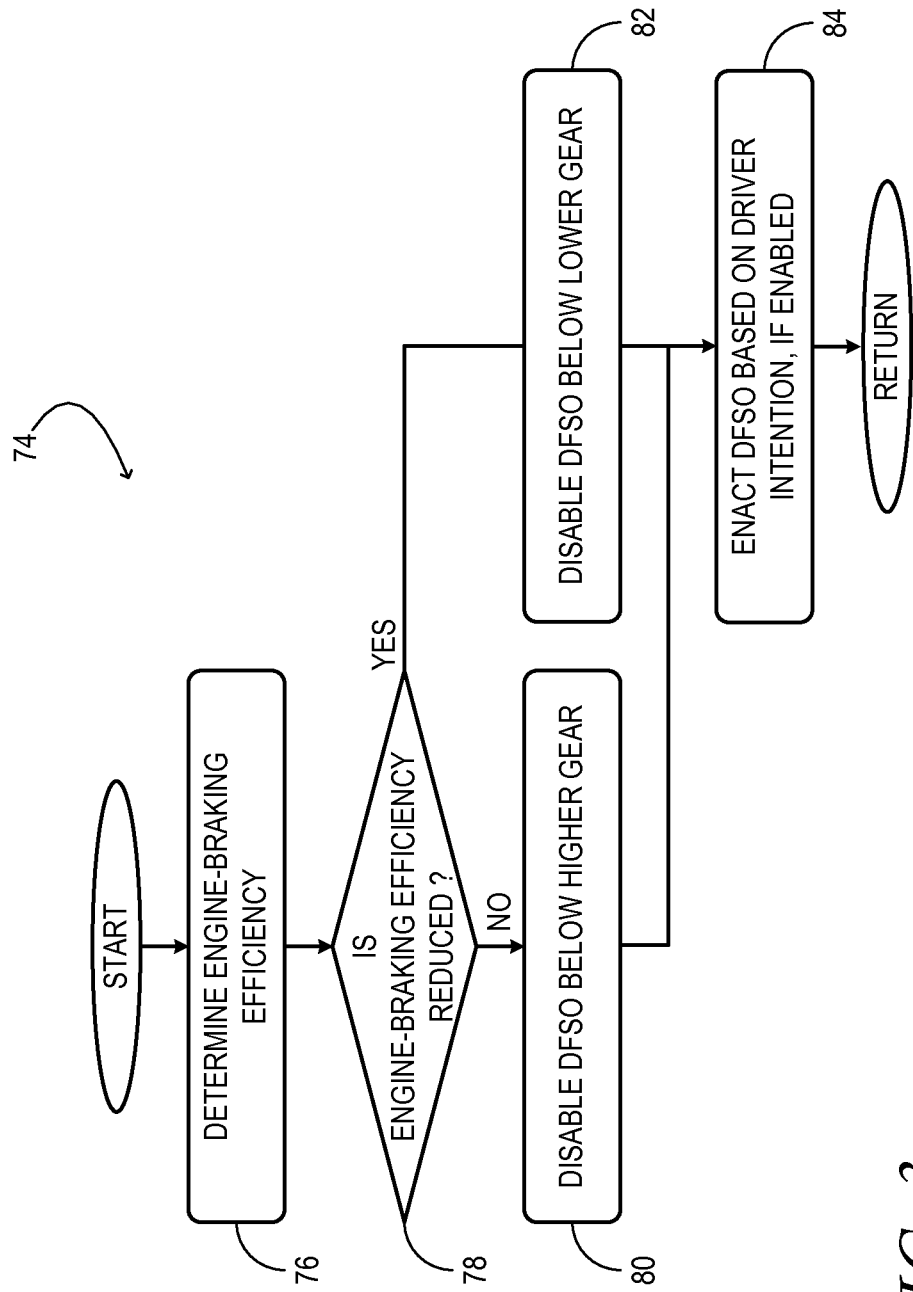
FIG. 3 illustrates an example method for enacting DFSO in a motor vehicle in accordance with an embodiment of this disclosure.

FIG. 3 illustrates an example method 74 for enacting DFSO in a motor vehicle in one embodiment. At 76 of method 74, the engine-braking efficiency is determined. In some embodiments, the engine-braking efficiency may be determined based on a state of one or more sensors in the motor vehicle. Road load may be determined with the aid of an inclinometer and/or a weight sensor coupled in the suspension of the motor vehicle, for example. An anti-lock braking system sensor also may be used to indicate a condition of diminished road load. Outside wheel diameter may be computed based on the combined outputs of a GPS receiver and a wheel-rotation speed sensor, for example. Alternatively, the change in tire diameter may be computed based on torque and measured vehicle acceleration under suitable conditions. In addition, a tow-hitch sensor or other towing componentry may provide an indication of the driven mass of the motor vehicle. For instance, when additional current is drawn from the brake-light circuit, the ECS may infer that a trailer is in tow and that the driven mass of the vehicle will be greater. The ECS of the motor vehicle may be configured, accordingly, to discriminate between a condition of normal engine-braking efficiency and a condition of reduced engine braking efficiency based on a state of one or more motor-vehicle sensors.

In other embodiments, the engine-braking efficiency may be determined based on driver input—e.g., input from one or more controls situated on the dashboard of the motor vehicle. Driver input may provide an estimate of overall driven mass (i.e., vehicle-system mass) and the driven-wheel diameter, for example. In still other embodiments, factors affecting engine-braking efficiency may be learned as the vehicle is being driven. Driven mass, for example, may be learned based on actual acceleration or deceleration of the vehicle on a level surface, in response to a known amount of motive or braking force.

In these and other embodiments, determining the engine-braking efficiency may include discriminating between a condition of normal engine-braking efficiency and a condition of reduced engine braking efficiency. Thus, at 78 it is determined whether the engine-braking efficiency is reduced. In one embodiment, the motor vehicle may drive a greater mass during the condition of reduced engine-braking efficiency than during the condition of normal engine-braking efficiency. The greater mass of the motor vehicle may be due to additional mass of a payload of the motor vehicle and/or a trailer towed by the motor vehicle. In another embodiment, a road load on the motor vehicle may be lower during the condition of reduced engine-braking efficiency than during the condition of normal engine-braking efficiency. For instance, the road grade beneath the motor vehicle may be steeper during the condition of reduced engine-braking efficiency than during the condition of normal engine-braking efficiency.

In other embodiments, the determination of normal versus reduced engine-braking efficiency may be influenced by the DFSO mode in use in the motor vehicle at under current conditions. Thus, the condition of normal engine-braking efficiency may include a condition in which air is pumped through one or more unfueled cylinders of the engine during the DFSO. The condition of reduced engine-braking efficiency may include a condition in which air is not pumped through the one or more unfueled cylinders of the engine during the DFSO, but where variable cam timing, for example, is used to keep closed the intake and exhaust valves of the unfueled cylinders. It is also conceivable that, with engines configured to enact both modes, air may be pumped through the unfueled cylinders only when the engine-braking efficiency is reduced.

In still other embodiments, an outside diameter of a driven wheel of the vehicle may be smaller during the condition of reduced engine-braking efficiency than during the condition of normal engine-braking efficiency. The condition of normal engine-braking efficiency may be a condition in which factory-sized tires are installed on the driven wheels of the vehicle; the condition of reduced engine-braking efficiency may be a condition in which larger (e.g., off-road) tires are installed on the driven wheels, for example.

If the engine-braking efficiency is not reduced, then the method advances to 80, where DFSO is disabled below a higher gear of the transmission—e.g., fifth gear of a six-speed transmission. However, if the engine-braking efficiency is reduced, then the method advances to 82, where the DFSO is disabled below a lower gear of the automatic transmission—e.g., fourth gear of a six-speed transmission. In some embodiments, DFSO may be enabled, with respect to transmission gear or vehicle speed, in any gear in which it is not disabled based on the current method. Naturally, however, other factors may also contribute to the determination of whether DFSO is ultimately enabled under a given set of conditions.

Accordingly, method 74 may provide, in one example, that during a condition of normal driven mass of the motor vehicle (e.g., a decreased driven mass, with no towing and/or a light payload), DFSO is disabled below a higher gear of the transmission. During a condition of increased driven mass (e.g., towing and/or heavy payload) DFSO may be disabled below a lower gear of the transmission. In this manner, DFSO may be applied more aggressively when the engine-braking efficiency is reduced. Under such conditions, the resulting deceleration from DFSO will be reduced. In some embodiments, the discrimination between normal and reduced engine-braking efficiency and the resultant changes in DFSO scheduling may be enacted automatically—i.e., without specific driver input.

At 84 the DFSO, if enabled under current conditions, is enacted subject to detected driver intention to decelerate. In some embodiments, such intention may be signaled by a depression of the brake pedal and/or release of the accelerator. In one embodiment, enacting DFSO may include closing a torque-converter bypass clutch when operating above the transmission gear at which the DFSO is to be disabled. In other words, if DFSO is to be disabled below fourth gear, then the bypass clutch may be closed at and above fourth gear, for example. Closing the torque-convertor bypass clutch may enable more effective engine braking than operating with the clutch open.

In some embodiments, entry into DFSO may be deferred until it can be determined whether the vehicle will exhibit suitable deceleration behavior with all cylinders operating normally. If a vehicle speed sensor indicates that the vehicle is decelerating by a suitable amount following release of the accelerator or a tap on the brakes, then no entry into DFSO may be commanded. In a more particular embodiment, the period of the deferral may be based on the transmission gear in use. If DFSO is enabled in a relatively low gear—because of reduced engine braking efficiency, for example—then the deferral period may be shorter than when DFSO is enabled in a relatively higher gear with normal engine-braking efficiency. This feature may better accommodate the vehicle operator's desire for more rapid engine braking on a steep downgrade, or when towing a significant mass, for example. Likewise, exit from DFSO may be deferred until it can be determined that the vehicle will not naturally attain a suitable rate of acceleration or coasting speed after the brake pedal is released. In some embodiments, this deferral period may be shorter during conditions of reduced engine-braking efficiency than during conditions of normal engine-braking efficiency.

In method 74, emphasis is placed on enabling and disabling DFSO at selected gear ratios of the transmission. Under some conditions, the transmission gear may be used as surrogate for vehicle speed. Thus, disabling the DFSO below the higher and lower gears of the transmission may include disabling the DFSO below a speed range of the motor vehicle. The speed range may include a lower speed during the condition of reduced engine-braking efficiency than during the condition of normal engine-braking efficiency. In one non-limiting example, DFSO may be disabled below 25 miles per hour at normal engine-braking efficiency, but below 12 miles per hour at reduced engine-braking efficiency. Furthermore, it will be understood that DFSO may be enabled or disabled based on other operating parameters of a motor vehicle besides vehicle speed and its surrogates. DFSO may be disabled at any speed, for instance, when a transmission temperature sensor indicates an over-temperature condition.

An example operation of a motor vehicle will now be described according to the embodiments presented above. In one scenario, a pickup truck with a 4.0-liter engine and a six-speed automatic transmission is driven on a highway of substantially level grade. The truck has an empty payload area and nothing attached to the tow hitch. As traffic slows, the driver takes his foot off the accelerator pedal, but the vehicle undergoes little deceleration with all cylinders operating. The ECS in the vehicle detects that the transmission is in fifth gear, where DFSO is to be enabled. As a result, fuel injection is suspended to one or more of cylinders of the engine, to effect a coasting deceleration. As traffic slows further, the transmission shifts to fourth gear and the fuel supply is restored to the cylinders that were previously unfueled, to avoid excessive deceleration under conditions of normal engine-braking efficiency. In alternative scenarios, in which the road grade is downward-sloping (e.g., 2% or greater), or the tow hitch is engaged, or a weight sensor on a vehicle strut indicates mass in the payload area, the cylinders may remain unfueled even in fourth gear, due to reduced engine-bra king efficiency.

In another scenario, a driver of the pickup truck replaces his factory-installed 32-inch tires with 40-inch tires, for off-road use. As soon as the vehicle is driven, the ECS detects the change in tire diameter based on the combined output of GPS and wheel-rotation speed sensors. Alternatively, the change in tire diameter may be received as operator input or computed based on torque and measured vehicle acceleration under suitable conditions. The change in tire size places the vehicle in a condition of reduced engine-braking efficiency, because the drive-line torque will be lower for every gear ratio of the transmission. Accordingly, DFSO may now be enabled in fourth gear, even at minimum driven mass and level road grade, though it would have been disabled at or below forth gear with the 32-inch tires. In this manner, DFSO scheduling may vary with road grade, driven mass, towing activity, and tire diameter to compensate for changes in engine-braking efficiency based on any or all of these factors.

Aspects of this disclosure are set forth by example, with reference to the illustrated embodiments described above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

In the methods illustrated and/or described herein, some of the indicated process steps may be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

It will be understood that the articles, systems, and methods described hereinabove are embodiments of this disclosure—non-limiting examples for which numerous variations and extensions are contemplated as well. This disclosure also includes all novel and non-obvious combinations and subcombinations of the above articles, systems, and methods, and any and all equivalents thereof.

The invention claimed is:

1. A method for enacting deceleration fuel shut off (DFSO) in a motor vehicle having an engine and a transmission, the method comprising:
   during a first condition where engine-braking efficiency is above a threshold, disabling DFSO below a transmission gear having a first gear ratio; and
   during a second condition where engine-braking efficiency is below the threshold, disabling DFSO below a transmission gear having a second gear ratio numerically higher than the first gear ratio.

2. The method of claim 1 wherein an outside diameter of a driven wheel of the vehicle is larger during the second condition than during the first condition.

3. The method of claim 1 wherein a road load on the motor vehicle during the second condition is lower than a road load on the motor vehicle during the first condition.

4. The method of claim 1 wherein a road grade beneath the motor vehicle during the second condition is steeper than a road grade beneath the motor vehicle during the first condition.

5. The method of claim 1 wherein the first condition includes a condition in which air is pumped through one or more unfueled cylinders of the engine during the DFSO, and wherein the second condition includes a condition in which air is not pumped through the one or more unfueled cylinders of the engine during the DFSO.

6. The method of claim 1 wherein disabling the DFSO below the transmission gear having the first gear ratio and disabling the DFSO below the transmission gear having the second gear ratio includes disabling the DFSO below a first speed of the motor vehicle during the first condition and disabling the DFSO below a second speed of the motor vehicle during the second condition, and wherein the second speed is lower than the first speed.

7. The method of claim 1 further comprising:
   sensing an intention of an operator of the vehicle to decelerate; and
   after the intention is sensed, enacting the DFSO after a first deferral period during the first condition, and enacting the DFSO after a second deferral period during the second condition, wherein the second deferral period is shorter than the first deferral period.

8. The method of claim 1 further comprising closing a torque-converter bypass clutch at and above the transmission gear having the second gear ratio during the second condition.

9. The method of claim 1 wherein a mass driven by the motor vehicle is greater during the second condition than during the first condition.

10. The method of claim 9 wherein the mass driven by the motor vehicle is greater during the second condition due to additional mass in one or more of a payload of the motor vehicle and a trailer towed by the motor vehicle.

11. The method of claim 9 further comprising learning the mass driven by the motor vehicle during operation of the motor vehicle.

12. The method of claim 1 further comprising discriminating between the first condition and the second condition.

13. The method of claim 12 wherein said discriminating includes discriminating based on an output of a sensor in the motor vehicle.

14. The method of claim 13 wherein the sensor is one or more of an inclinometer, a weight sensor coupled in a suspension of the motor vehicle, an engine-speed sensor, and a wheel-rotation speed sensor.

15. The method of claim 12 wherein said discriminating includes discriminating based on input from a driver of the motor vehicle.

16. A method for enacting deceleration fuel shut off (DFSO) in a motor vehicle having an engine and a stepped-ratio transmission, the method comprising:
increasing a number of gear ratios of the transmission in which the DFSO is available as a driven mass of the vehicle increases.

17. The method of claim 16 wherein the transmission is an automatic transmission.

18. The method of claim 16 wherein the motor vehicle is a driving portion of a motor-vehicle system that also includes a towed portion, and wherein the motor vehicle drives the towed portion.

19. A method for enacting deceleration fuel shut off (DFSO) in a motor vehicle having an engine and a transmission, the method comprising:
during a first condition, disabling the DFSO below a transmission gear having a first gear ratio; and
during a second condition, disabling the DFSO below a transmission gear having a second gear ratio numerically higher than the first gear ratio,
wherein a driven mass of the motor vehicle during the first condition is less than a driven mass of the motor vehicle during the second condition.

20. The method of claim 19 wherein the second condition includes a condition in which the motor vehicle is towing a trailer.

* * * * *